United States Patent [19]

Linnerooth et al.

[11] 3,713,097

[45] Jan. 23, 1973

[54] TEST BIT PATTERN GENERATOR FOR PATTERN RECOGNITION MACHINES

[75] Inventors: John D. Linnerooth, Rochester; Erhardt W. Rosen, Kasson, both of Minn.

[73] Assignee: International Business Machines Corporation, Armonk, N.Y.

[22] Filed: May 14, 1971

[21] Appl. No.: 143,423

[52] U.S. Cl........340/146.3 ED, 340/146.1, 324/73 R

[51] Int. Cl...............................................G06f 11/04

[58] Field of Search...340/146.1 E, 146.3 ED, 146.2, 340/146.3 A, 146.3 Z; 356/71; 324/73 R, 73 AT

[56] References Cited

UNITED STATES PATENTS

| | | | |
|---|---|---|---|
| 3,528,006 | 9/1970 | Davis, Jr. et al. | 340/146.2 |
| 3,247,508 | 4/1966 | Bradford et al. | 340/146.3 A |
| 3,562,710 | 2/1971 | Halleck | 340/146.1 E |
| 3,581,074 | 5/1971 | Waltz | 324/73 R |
| 3,622,877 | 11/1971 | MacDavid et al. | 340/146.1 E |
| 3,643,069 | 2/1972 | Kikuchi | 340/146.3 Z |

*Primary Examiner*—Thomas A. Robinson
*Attorney*—Donald F. Voss et al.

[57] ABSTRACT

The scanner of the pattern recognition machine scans a pre-printed document containing a number of patterns which correspond to the number of test bits to be produced. There are two distinguishing patterns which produce binary one and zero bits. The patterns are printed in a sequence dictated by the desired test bit pattern. The resulting binary bits forming the test pattern are applied to the recognition logics. The pre-printed document also carries a set of patterns which, when scanned, produce a binary bit pattern identifying the test bit pattern. This identification is compared with the identification bit pattern produced by the recognition logics. An equal comparison indicates that the recognition logics are functioning properly. An error condition causes the pre-printed pattern to be displayed. The machine operator or maintenance man can read the display and determine which recognition logics should be probed to find the error.

10 Claims, 18 Drawing Figures

INVENTORS
JOHN D. LINNEROOTH
ERHARDT W. ROSEN

BY Donald F Voss
ATTORNEY

TEST BIT PATTERN GENERATOR FOR PATTERN RECOGNITION MACHINES

BACKGROUND OF THE INVENTION

1. Field of the Invention

The invention relates to a method and apparatus for diagnosing combinatorial logics and more particularly relates to a method and apparatus for off-line diagnosis of a pattern recognition machine and still more particularly to a method and apparatus for generating test bit patterns for off-line diagnosis of pattern recognition machines.

2. Description of the Prior Art

In the past, it has been the practice to load the pattern recognition machine with test patterns stored on magnetic tape. This requires the pattern recognition machine to be connected to a computer system which would effect the transfer of test patterns from the tape to the pattern recognition machine. The computer system would also run the diagnostic program and perform the comparison for error determination. This approach is relatively expensive because it requires a computer system.

The present invention overcomes the requirement of having a computer system connected to the pattern recognition machine. According to the present invention, the scanner of the pattern recognition machine is used in combination with a pre-printed document and special logics for generating the test bit patterns. Logic is also added to perform the compare operation for error detection purposes. Hence, the diagnosis can be performed off-line.

SUMMARY

The invention enables the generation of predetermined bit patterns which are entered into the storage register of the pattern recognition machine. The stored bit patterns are applied to selected logic functions such as the recognition logics within the pattern recognition machine to determine if these logics are performing properly. The test bit patterns represent the bits which will cause the known recognition to take place if the recognition logics are performing satisfactorily.

The test bit patterns are generated in response to scanning a document which is pre-printed with predetermined sequence of two distinguishing patterns. One pattern or character is resolved into a one bit and the other distinguishing pattern or character is resolved into a zero bit. The number of pre-printed patterns at least equals the number of bits to be presented to the logics to be tested. The arrangement of the pre-printed patterns is varied to enable testing all branches of the logics.

Normally, the recognition logics of pattern recognition machines include branches for identifying degraded patterns or patterns with voids or missing parts. It is very difficult to print a document with the entire range of patterns which the pattern recognition machine has been designed to recognize. However, test bit patterns can be formed by hand or with the aid of a computer program which will insure that all branches of the logic and all possible conditions will be tested. The test bit patterns determine the sequence of the distinguishing characters on the pre-printed test document. Hence, test documents can be printed with a sequence of two distinguishing characters which will cause the desired test bit patterns to be produced as simplified recognition circuits respond to the video signals resulting from scanning the distinguishing characters.

The test document includes a sequence of distinguishing patterns or characters which will be resolved into an identification byte for the associated test bit pattern. In this connection, a sequence of distinguishing patterns or characters are also pre-printed on the document and are resolved to select or gate the recognition logics to be tested for the particular test bit pattern. In the event of an error condition, the sequence of pre-printed distinguishing characters for the particular test bit pattern are displayed to the machine operator. A binary number identifying the test pattern is printed on the test document along with printed symbols of the recognition logics tested. The symbols associated with one bits, if any, in the binary number, indicate to the operator which pattern should have been identified by the recognition logics and the operator would probe the circuits of the recognition logics for the symbols printed to find the errors.

It is a principal object of the invention to provide improved method and apparatus for off-line diagnosis of a pattern recognition machine which:

a. are relatively inexpensive;

b. utilize the scanning capabilities of the pattern recognition machine;

c. utilize documents pre-printed with test patterns;

d. test all branches of the recognition logics of the pattern recognition machine; and e. displays in visual form the identification of the recognition logics to be probed for error conditions.

BRIEF DESCRIPTION OF THE DRAWINGS

FIG. 8 consists of FIGS. 8A and 8B.

FIG. 13 is a schematic diagram consisting of FIGS. 13A and 13B to illustrate test bit patterns in the consolidation register as a line of characters on the pre-printed document of FIG. 11 have been scanned.

DESCRIPTION

Figure 1:
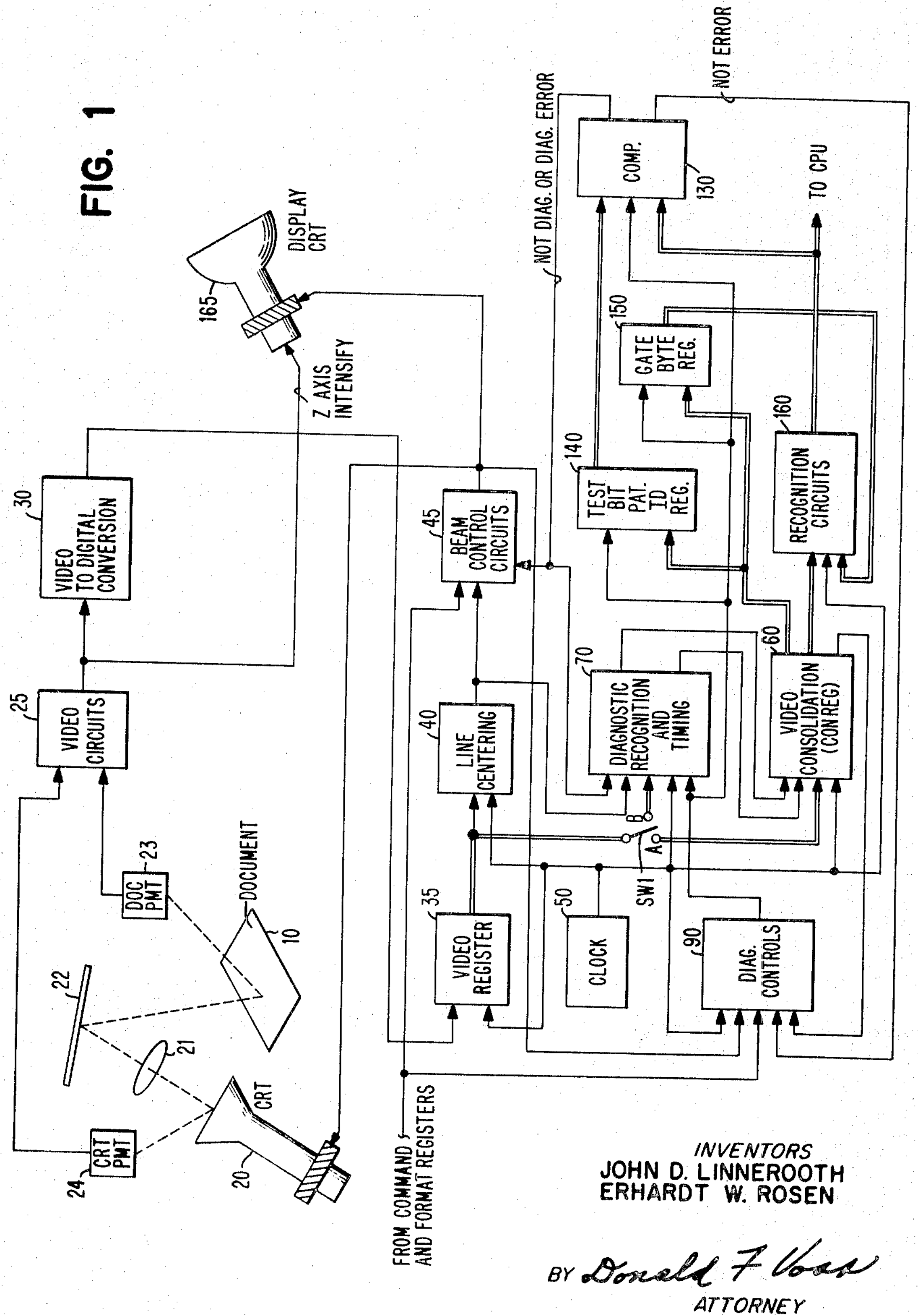
FIG. 1 is a schematic block diagram illustrating the invention incorporated into a character recognition machine.

With reference to the drawings, and particularly to FIG. 1, the invention is illustrated by way of example as being incorporated into a character recognition machine such as IBM's 1288 Optical Page Reader, which is shown and described in the IBM Field Engineering Theory of Operation Manual 1288 Optical Page Reader, Form No. SY31–0239–0 and IBM Field Engineering Maintenance Diagrams For the 1288 Optical Page Reader, Form No. SY31–0216–1, both of these manuals have been deposited with the Registrar of Copyrights, Library of Congress. The contents of these manuals are incorporated by reference.

In FIG. 1, test document 10 is scanned by the beam from cathode ray tube (CRT) 20 which is deflected under the control of beam control circuits 45. The beam of 20 is focused by lens 21 and reflected by mirror 22 onto document 10. The beam is reflected from document 10 to photomultiplier tube (PMT) 23 which develops an output signal varying according to the amount of light reflected from document 10. The output of 23 is greater when light is reflected by the background area of 10 than when it is reflected by the printed area. The output signal from photomultiplier tube 23 is applied to video circuits 25. These circuits also have an input from photomultiplier tube 24 which monitors the amount of light emitted by CRT 20. The intensity of the beam varies due to phosphor voids and therefore it is desirable to eliminate this variance so that the video signal is a measure of document reflectance. Hence, the output of the monitoring photomultiplier tube 24 is also applied to video circuit 25. The signal from 24 is subtracted from the signal from 23 to compensate for differences in light intensity.

The output of video circuit 25 is applied to video to digital conversion circuits 30. These circuits digitize the analog video signal from 25 into bits indicating the presence or absence of a character or pattern. These digitized video bits are entered into video register 35. Video register 35 is an 87-position shift register. One recognition scan produces 42 digitized video bits. A video bit is shifted into the video register 35 each microsecond of a small raster recognition scan. The retrace time of the small raster recognition scan is approximately 6 microseconds. The video register 35 does not shift during this time. Bits shifted out of the last position, i.e., position 87 of video register 35, are lost.

Normally the video bits from register 35 are applied to the video consolidation logic 60 which includes consolidation operator logic for consolidating bits into a lesser number of bits which are then entered into the consolidation register 61 of 60. However, in order to enter a known bit pattern into the consolidation register 61, the video bits in register 35 are applied to the diagnostic recognition and timing circuit 70. A diagnostic switch SW1 is set to position A when in the recognition mode and to position B when in the diagnostic mode. Other operations of the machine, such as line centering, are the same for the diagnostic mode as they are for the recognition mode. The diagnostic recognition and timing circuit 70 functions to produce a single video bit for each character scanned on document 10 and to produce shift pulses for shifting bits in the consolidation register.

Figure 2:
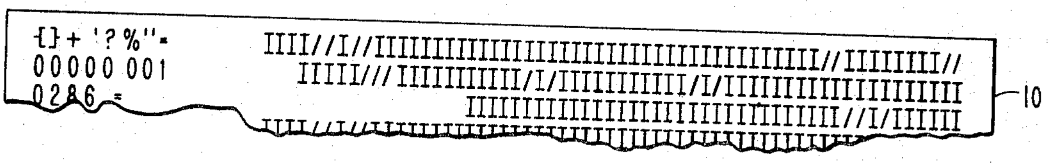
FIG. 2 is a diagram illustrating part of the pre-printed test document which is scanned by the character recognition machine when in the diagnostic mode to produce the test bit pattern.
Figure 8A:
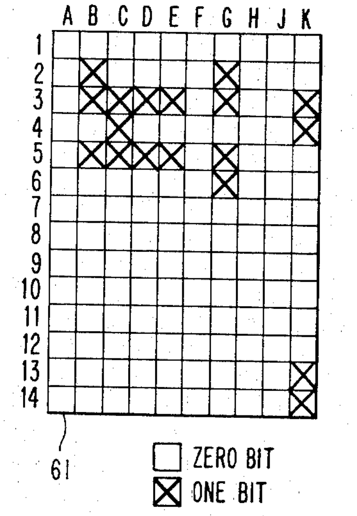
FIG. 8A is a schematic diagram illustrating the bit conditions of the consolidation register with the marker bit in the output position or position K–14.
Figure 8B:
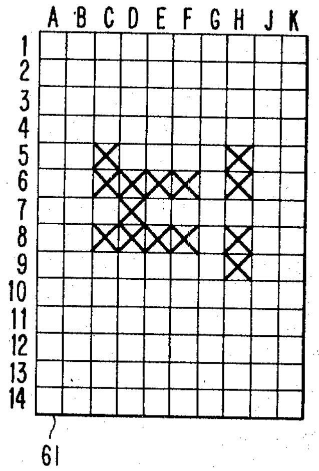
FIG. 8B is a schematic diagram illustrating the consolidation register with a complete test bit pattern therein after three lines have been scanned.

The pre-printed characters on document 10, FIGS. 1 and 2, are read line-by-line from right to left. In this example, three lines of printed characters are necessary for producing the test bit pattern. Two distinguishing patterns or characters are used. A slash symbol (/) is resolved by circuit 70 to represent a 1 bit, and the character I is resolved by circuit 70 to represent a 0 bit. The first character scanned is a slash symbol (/) and it develops a marker bit which is the first bit entered into the consolidation shift register 61 of video consolidation 60. This marker bit functions to develop a timing or strobe pulse when it is in the last or output position of the consolidation register 61. The next eight characters scanned represent a bit pattern which should be produced by the tested recognition logics if they are functioning properly. This sequence of characters is followed by a sequence of seven characters which select or turn on the recognition logics to be tested. All other recognition logics are turned off. The next character in line provides an indication as to whether the testing takes place in the numeric or alpha-numeric mode. The remaining characters printed on that line when scanned produce the test bit pattern together with the characters on the next two lines. When the first three lines on document 10 have been scanned, the test bit pattern in the consolidation register 61 will be as shown in FIG. 8B.

Figures 3, 4:
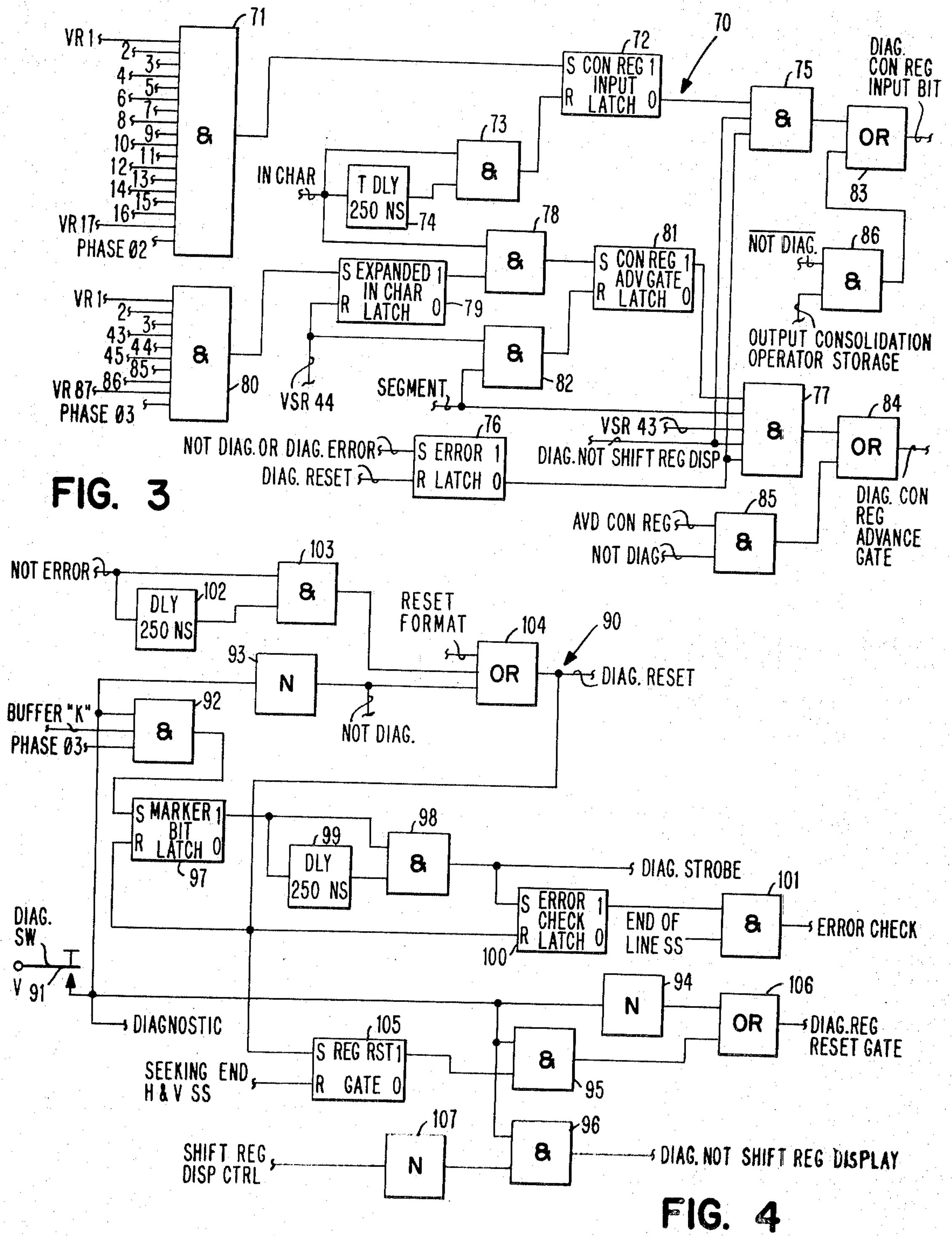
FIG. 3 is a schematic logic diagram showing the details of the diagnostic recognition and timing logic.
FIG. 4 is a schematic logic diagram of the diagnostic controls.

The details of the diagnostic recognition and timing circuit 70 are shown in FIG. 3. In FIG. 3, logical AND circuit 71 has inputs connected to the first 17 positions of video register 35. AND circuit 71 is conditioned by a phase 2 signal from clock 50. The clock is shown and described in the IBM Field Engineering Theory of Operation Manual on page 2–97. The output of AND circuit 71 is connected to the set input of Consolidated Register Input latch 72 which is first reset upon determining that the beam of 20 is in a character. The In-Character signal coming from line centering circuit 40, FIG. 1, is applied to AND circuit 73 and to time delay circuit 74. The output of time delay circuit 74 conditions AND circuit 73. The output from AND circuit 73 is connected to the reset input of latch 72. The reset output of latch 72 is applied to AND circuit 75 which provides the bit for the consolidation register 61.

AND circuit 75 has two other inputs. One is from the diagnostic control circuit 90 and the other is from the reset output of Error latch 76. Error latch 76 is set by a signal, Not Diagnostic or Diagnostic Error which comes from compare circuit 130. Latch 76 is reset by a Diagnostic Reset signal coming from diagnostic control 90. Hence, AND circuit 75 will have an output if latches 72 and 76 are in the reset condition, and the Diagnostic Not Shift Register Display signal is present.

The character I will have at least 17 consecutive black bits and therefore, when it is scanned, latch 72 will be set. Thus a 0 bit is developed when the character I is scanned. On the other hand, when the slash symbol (/) is scanned, there will not be 17 consecutive black bits set into the video register 35, and therefore, latch 72 will not be set and AND circuit 75 will produce an output indicating a 1 bit. The 1 and 0 bits passed by AND circuit 75 are set into the consolidation register under control of AND circuit 77.

The In-Character signal is expanded by AND circuit 78 which receives the In-Character signal and a signal from the set output of expanded In-Character latch 79. The set input of this latch is connected to the output of AND circuit 80 which has inputs connected to video register positions 1–3 inclusive, 43–45 inclusive and 85–87 inclusive. AND circuit 80 is strobed by the phase 3 timing signal from clock 50. The reset input of latch 79 is connected to position 44 of the video sample ring (VSR), shown and described on page 2–97 of the IBM Field Engineering Theory of Operation Manual.

The output of AND circuit 78 sets the Consolidation Register Advance Gate latch 81. This latch is reset by the output of AND circuit 82 which has an input connected to position 42 of the video sample ring and an input connected to receive a Segmentation signal which indicates that a character has been completely scanned. This Segmentation signal coming from line centering 40, FIG. 1, is also applied to an input of AND circuit 77 together with an input from the set output of latch 81, an input from position 43 of the video sample ring, an input from Diagnostic Not Shift Register Display and an input from the reset output from latch 76.

The output of AND circuit 75 is applied to OR circuit 83 along with the output of AND circuit 86 which has an input from the consolidation operator storage of video consolidation 60 and an input from diagnostic control circuit 90. The output of the consolidation operator storage is the normal input to the consolidation register 61, see pages 2–103 and 2–106 of the IBM Field Engineering Theory of Operation Manual. The output of AND circuit 77 is applied to OR circuit 84 which also has an input connected to the output of AND circuit 85. AND circuit 85 enables the normal shifting of the consolidation register 61. It has an input for receiving the Advance Gate signals for advancing the consolidation register and an input for receiving a Not Diagnostic signal which indicates that the machine is not operating in the diagnostic mode.

The details of the diagnostic controls 90 are shown in FIG. 4. Diagnostic controls 90 include a diagnostic switch 91 which is closed by the operator to place the machine in the diagnostic mode. This switch conditions AND circuits 92, 95 and 96 and is also connected to inverters 93 and 94. AND circuit 92 functions to detect the marker bit and sets marker bit latch 97. In addition to the input from switch 91, AND circuit 92 has an input connected to the last position or the buffer K position of the consolidation register 61, see page 2–106 of the IBM Field Engineering Theory of Operation Manual, and an input connected to receive a phase 3 timing signal. The Marker Bit latch 97 provides two functions. It assists in generating a strobe signal for gating the expected byte and gating byte out of the consolidation register 61 into registers 140 and 150 respectively, and aids in the generation of the Error Check signal.

Latch 97 has its set output connected to AND circuit 98 and to time delay 99. Time delay 99 functions to provide a pulse to AND circuit 98. The output of AND circuit 98 sets Error Check latch 100 and its set output is applied to AND circuit 101. The Error Check signal is taken from AND circuit 101 which also receives an End-Of-Line Singleshot signal indicating that it is time to check the outputs of the recognition logics. It might be noted that the Marker Bit latch 97 eliminates the need to count the lines scanned on document 10. This is because the marker bit will not be in the buffer K position until scanning of the third line has begun. Hence, even though the End-Of-Line Singleshot signal is present for each end-of-line condition, AND circuit 101 will not pass the Error Check signal until three lines have been scanned. Of course, this arrangement depends upon the particular machine incorporating the invention.

Latches 97 and 100 are reset by a signal coming from OR circuit 104. The signal provided by switch 91 is inverted by inverter 93 and the output thereof is applied to OR circuit 104. A Not Error signal coming from compare circuit 130 is applied to delay 102 and AND circuit 103. Delay 102 provides a pulse to AND circuit 103 which is passed by OR circuit 104 for resetting latches 97 and 100. Additionally, OR circuit has an input connected to receive a Reset Format signal which comes from beam control circuit 45. The output signal from OR circuit 104 is called Diagnostic Reset. It is also applied to the set input of latch 105. The set output of latch 105 is applied to an input of AND circuit 95. The output of AND circuit 95 together with the output of inverter 94 are applied to inputs of OR circuit 106. The output of OR circuit 106 is connected to reset the consolidation register 61 of video consolidation 60. Latch 105 is reset by a signal called Seeking End Horizontal and Vertical Singleshot from beam control 45. The output of AND circuit 96 functions to prevent advance of the consolidation register and it will be recalled that this signal is applied to AND circuits 75 and 77 of the diagnostic recognition and timing circuit 70. The other input to AND circuit 96 comes from inverter 107 which receives a Shift Register Display Control signal. This signal is used for displaying the bit conditions of the consolidation register.

Figure 5:
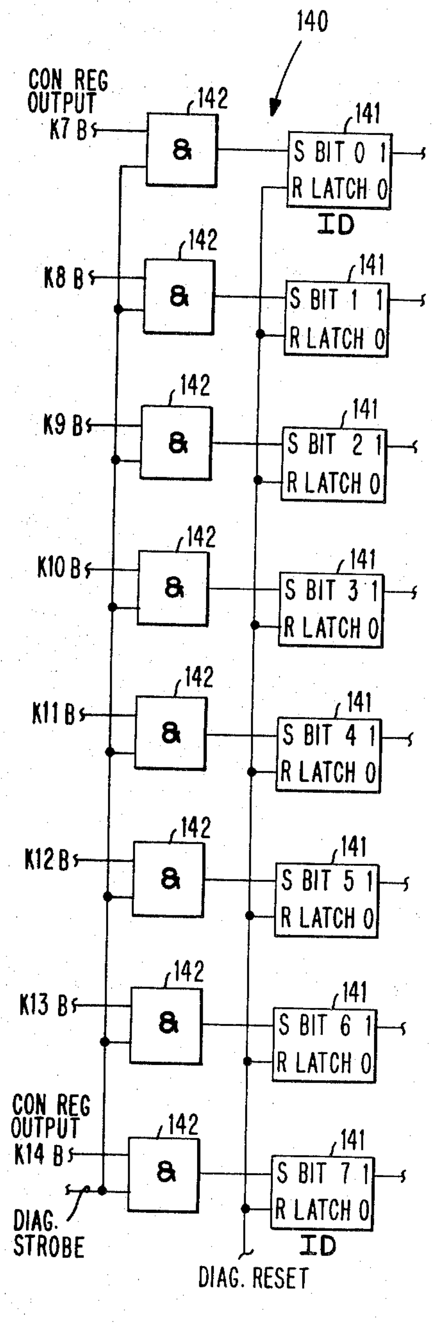
FIG. 5 is a schematic logic diagram of the test bit pattern identification register and controls for entering therein the bits forming the expected byte which must be matched by the bits produced by the logic being tested in order for no error condition to exist.

The expected byte or group of bits which represent the known recognition which should result from the test bit pattern are set in register 140 which is shown in detail in FIG. 5. Register 140 consists of eight latches 141. Latches 141 have their set inputs connected to AND circuits 142 and their reset inputs connected to the output of OR circuit 104 for receiving the Diagnostic Reset signal from diagnostic controls 90. Each AND circuit 142 has an input connected to one position of the consolidation register 61, i.e., positions K7 through K14, and an input connected to the output of AND circuit 98 for receiving the Diagnostic Strobe signal from diagnostic controls 90. Thus, latches 141 are first reset by a signal from OR circuit 104 and then the expected byte is transferred to the latches 141 via the AND circuits 142. The set output of latches 141 are connected to compare circuit 130.

Figure 6:
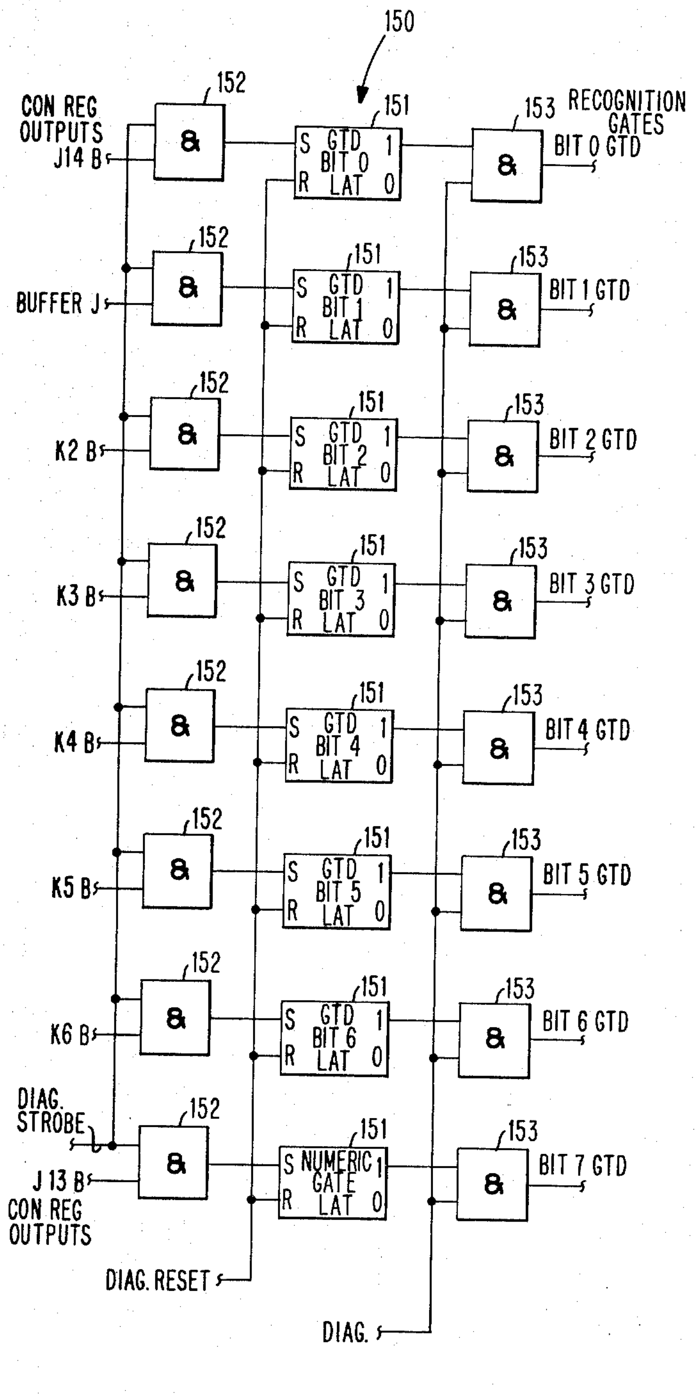
FIG. 6 is a schematic logic diagram for the register and controls for entering therein the bits of the gating byte for selecting the recognition logics to be tested.

The gating byte and the bit indicating that the numeric logics are to be tested are set into register 150, FIG. 6, which consists of latches 151. Latches 151 have the set inputs thereof connected to outputs of AND circuits 152 and the reset inputs thereof connected to the output of OR circuit 104, FIG. 4. AND circuits 152 each have an input connected to a position in the consolidation register. The positions are K14, Buffer J, K2–K6 inclusive, and J13. AND circuits 152 are conditioned by the output signal from AND circuit 98, FIG. 4. The set outputs of latches 151 are connected to inputs of AND circuits 153 and these AND circuits are conditioned by a signal from diagnostic switch 91, FIG. 4. The outputs of AND circuits 153 are applied to the recognition logics 160 shown in block form in FIG. 1.

Figure 7:
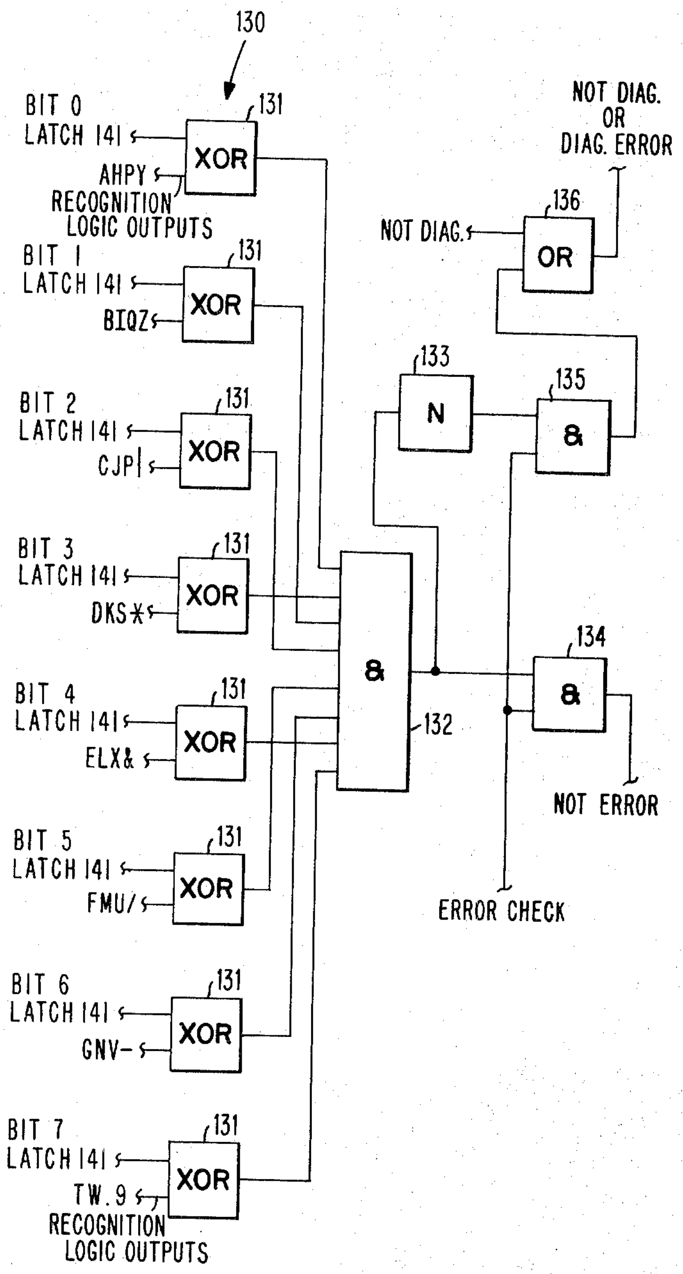
FIG. 7 is a schematic logic diagram of the compare circuits for comparing the bits from the test bit pattern identification register with the bits from the recognition circuits of the character recognition logic.

Compare circuit 130 is shown in detail in FIG. 7. It includes exclusive OR circuits 131 which have inputs connected to the outputs of latches 141 and to outputs of recognition circuits 160. The outputs of exclusive OR circuits 131 are connected to inputs of AND circuit 132. Exclusive OR circuits 131 function to determine whether the known character identification stored in latches 141 compares exactly with the identification produced by the recognition circuits 160. If any exclusive OR circuit 131 does not have an output indicating a favorable comparison, AND circuit 132 will not pass a signal indicating that no error condition exists. The output of AND circuit 132 is connected to inverter 133 and to AND circuit 134. The output of inverter 133 is connected to AND circuit 135. AND circuits 134 and 135 indicate a Not Error and Error conditions respectively. These AND circuits are conditioned by the Error Check signal from AND circuit 101, FIG. 4. The output of AND circuit 135 is connected to an input of OR circuit 136 which also has an input connected to the output of inverter 93, FIG. 4. The output of OR circuit 136 is connected to beam control circuits 45 for the purpose of displaying lines on document 10 on display CRT 165 FIG. 1. The output signal from OR circuit 136 is also applied to the set input of error latch 76, FIG. 3, and this prevents AND circuits 75 and 77 from putting a bit into the consolidation register 61.

From the foregoing, it is seen that switch SW1 is closed to the contact B position and switch 91 is closed to place the machine in the diagnostic mode. Switches SW1 and 91 could actually be the same switch. Document 10 is fed into the machine and scanning takes place in the normal manner. The first character scanned is the slash symbol (/). As this symbol is scanned, video bits will be produced and entered into video register 35. The slash symbol (/) will not produce a sequence of 17 black bits, and therefore, as it is scanned, AND circuit 71, FIG. 3, will not be satisfied. Thus, latch 72 will not be set and AND circuit 75 will produce an output because Error Latch 76 will be in the reset state and the Diagnostic Not Shift Register Display signal will be present. Latch 72 will be in the reset condition because as the slash symbol (/) is scanned, the In-Character signal will be developed to satisfy the input conditions of AND circuit 73.

This 1 bit condition appearing at the output of AND circuit 75 will be passed by OR circuit 83 into the consolidation shift register 61 under control of the shift signal from OR circuit 84. OR circuit 84 will provide the shift signal when the inputs to AND circuit 77 are satisfied. AND circuit 85 will not have an output at this time to shift the consolidation register because switch 91, FIG. 4, is closed and therefore, the output of inverter 93 is at a down level. Latch 81, FIG. 3, will be set because the slash symbol (/) produces sufficient number of black bits to satisfy the input conditions of AND circuit 80, whereby latch 79 will be set and of course, the In-Character signal is available. Even though latch 81 is set at this time, AND circuit 77 will not have an output until the Segmentation signal is available, indicating that the slash symbol (/) has been scanned, and the video sample ring has reached position 43, indicating that a scan has been completed. Of course, the Error latch 76 will be in the reset condition at this time because the Diagnostic Reset signal will be available from OR circuit 104 because of the Reset Format signal. The Not Diagnostic or Diagnostic Error signal will not be available to set latch 76 because switch 91 is closed and a Diagnostic Error has not occurred. The Diagnostic Not Shift Register Display signal will be present from inverter 107. Thus, a signal from AND circuit 77 will shift the bit from OR circuit 83 into the consolidation register 61. This shifting takes place via OR circuit 84. Thereafter, the video sample ring pulse from position 44 thereof will reset latch 81 via AND circuit 82. Latch 79 will already have been reset by VSR 44. Latch 72 will still be in the reset condition.

The next character scanned is a slash symbol (/) and this is the first character of the expected byte. After this slash symbol (/) has been scanned, a 1 bit will be entered into the consolidation shift register 61 in the manner previously indicated. The next character scanned is an I. As the I is scanned, there will be 17 consecutive black bits entered into video register 35. Thus, the input conditions of AND circuit 71 will be satisfied and a signal will be passed for setting latch 72. Because latch 72 is set, AND circuit 75 will not be conditioned and a 0 bit will be entered into the consolidation shift register 61 when AND circuit 77 is satisfied. Of course, a shift pulse will be developed by AND circuit 77 because AND circuit 80 will generate an output to set latch 79 and the In-Character signal will be available. Thus, AND circuit 78 will set latch 81 and as previously described. The Error latch 76 will be in the reset state and therefore, when the Segment signal is available together with VSR 43, AND circuit 77 will pass a signal to OR circuit 84.

The remaining characters on the line will be scanned and for each slash symbol (/) a one bit will be entered into the consolidation register and for each character I a 0 bit will be entered into the consolidation register. The lines are scanned sequentially and after 25 characters have been scanned in the third line on the document, the marker bit will be in position buffer K of the consolidation register as seen in FIG. 8A, and the inputs to AND circuit 92, FIG. 4, will be satisfied at phase 3 time. Latch 97 will be set and after 250 nanosecond delay, AND circuit 98 will condition AND circuits 142 for transferring the expected byte from the consolidation register to latches 141 and condition AND circuits 152 to transfer the gating byte and the numeric bit to latches 151.

After the third line has been completely scanned, the bit conditions of the consolidation register 61 will be as shown in FIG. 8B. At this time, the recognition logics which are selected by the gating byte via AND circuits 153 will provide an identification byte to compare circuit 130. The expected byte from register 140 has already been provided to compare circuit 130. The error check signal will be available from AND circuit 101 at this time because the Error Check latch 100 has been set by the output of AND circuit 98 and the End-Of-Line Singleshot will be available after the third line has been scanned. The character to be recognized is an equal sign, and if the recognition logics are operating properly, AND circuit 134 will provide an output signal to indicate a Not Error condition. If an error does occur, inverter 133 will provide a signal to AND circuit 135 and OR circuit 136 will provide a signal for preventing reset of the consolidation register and for displaying the third line of document 10 on display CRT 165. The displayed line indicates that the equal sign should have been recognized. With this information, the person running the diagnostic would check the recognition circuits for the symbols printed at the left hand margin and above the binary number for the expected byte.

Figure 9A:
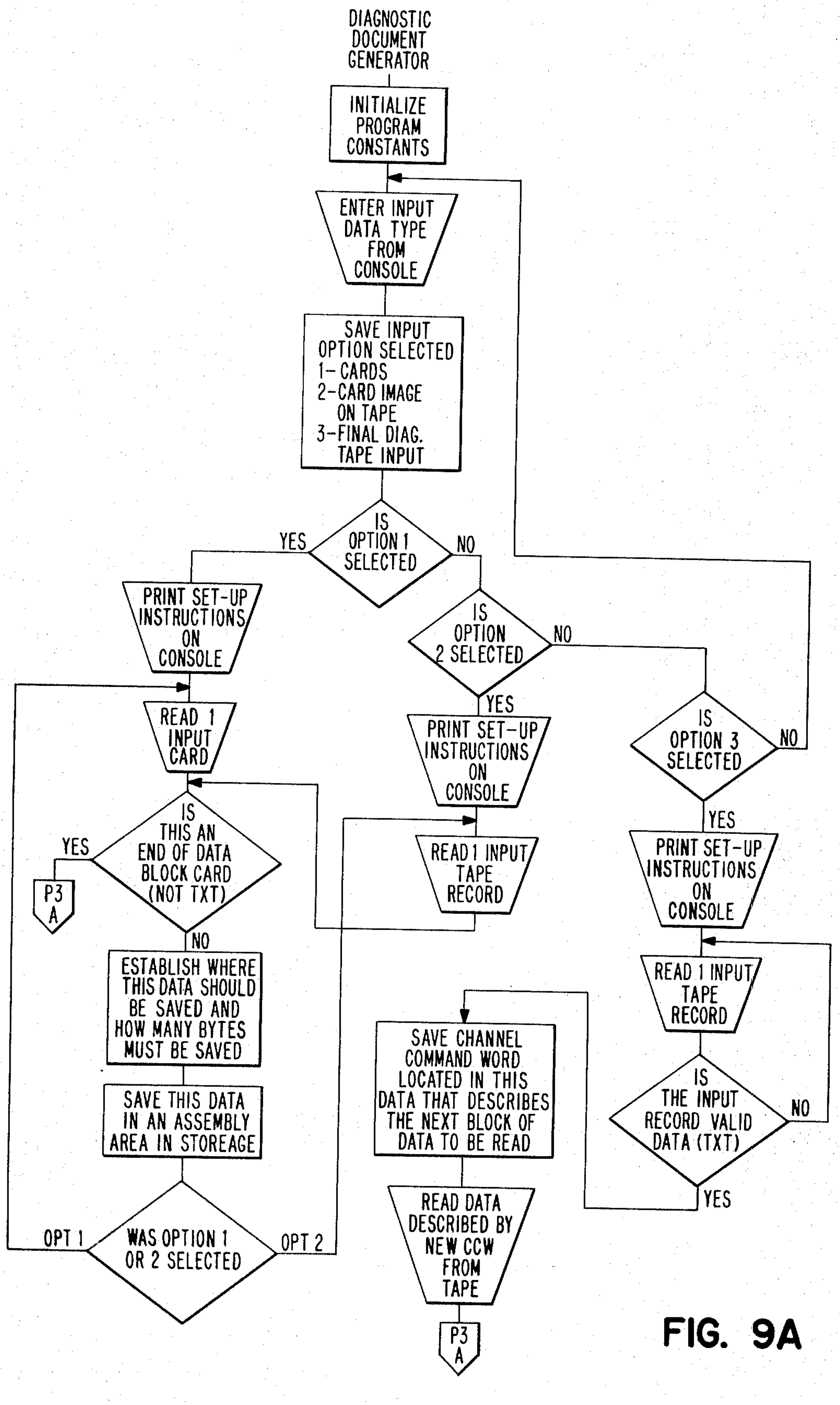
FIG. 9 consists of FIGS. 9A, 9B and 9C, and is a flow diagram illustrating the method or program for printing test documents according to test bit patterns which have been stored on record cards or tape.
Figure 9B:
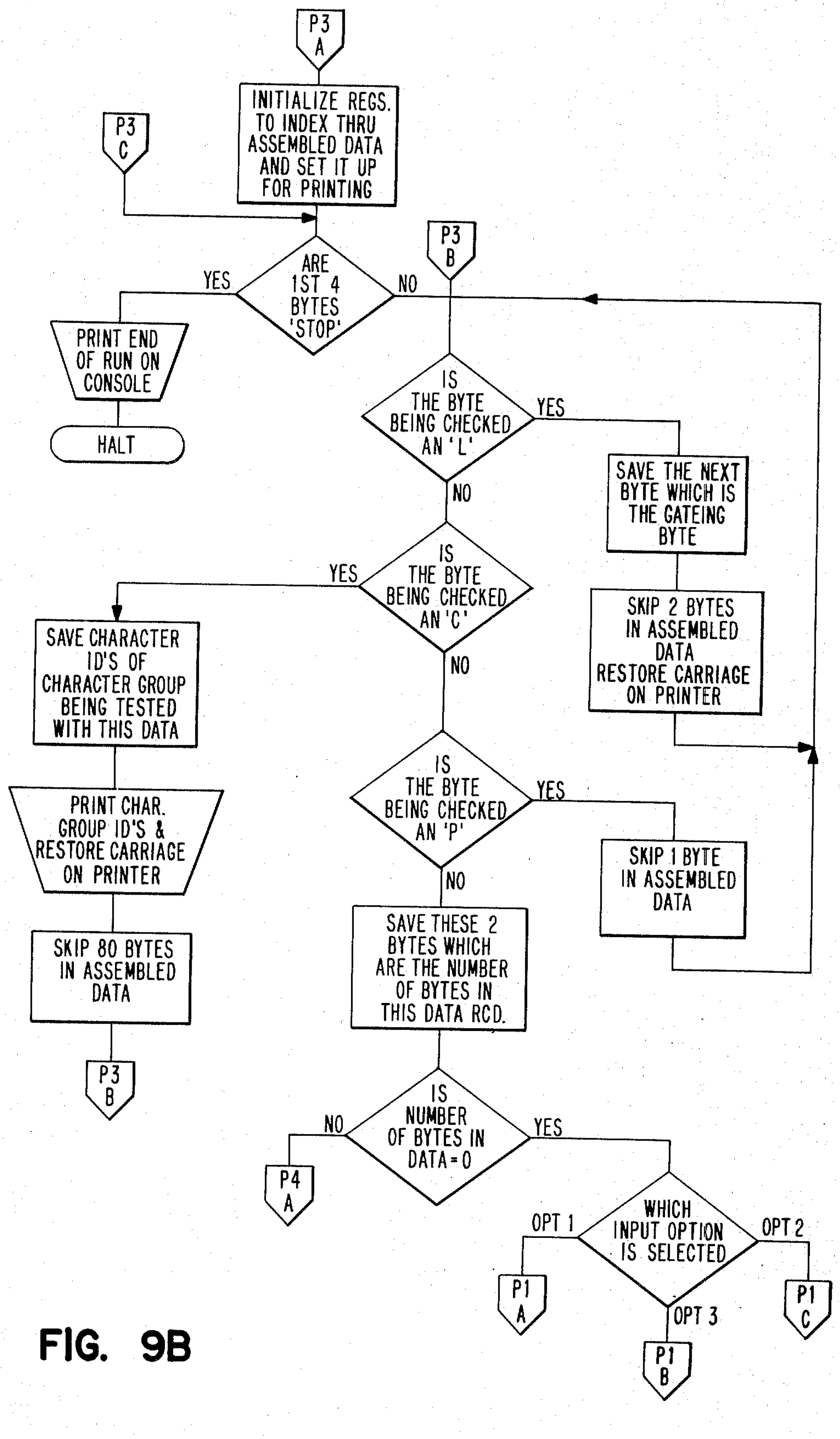
Figure 9C:
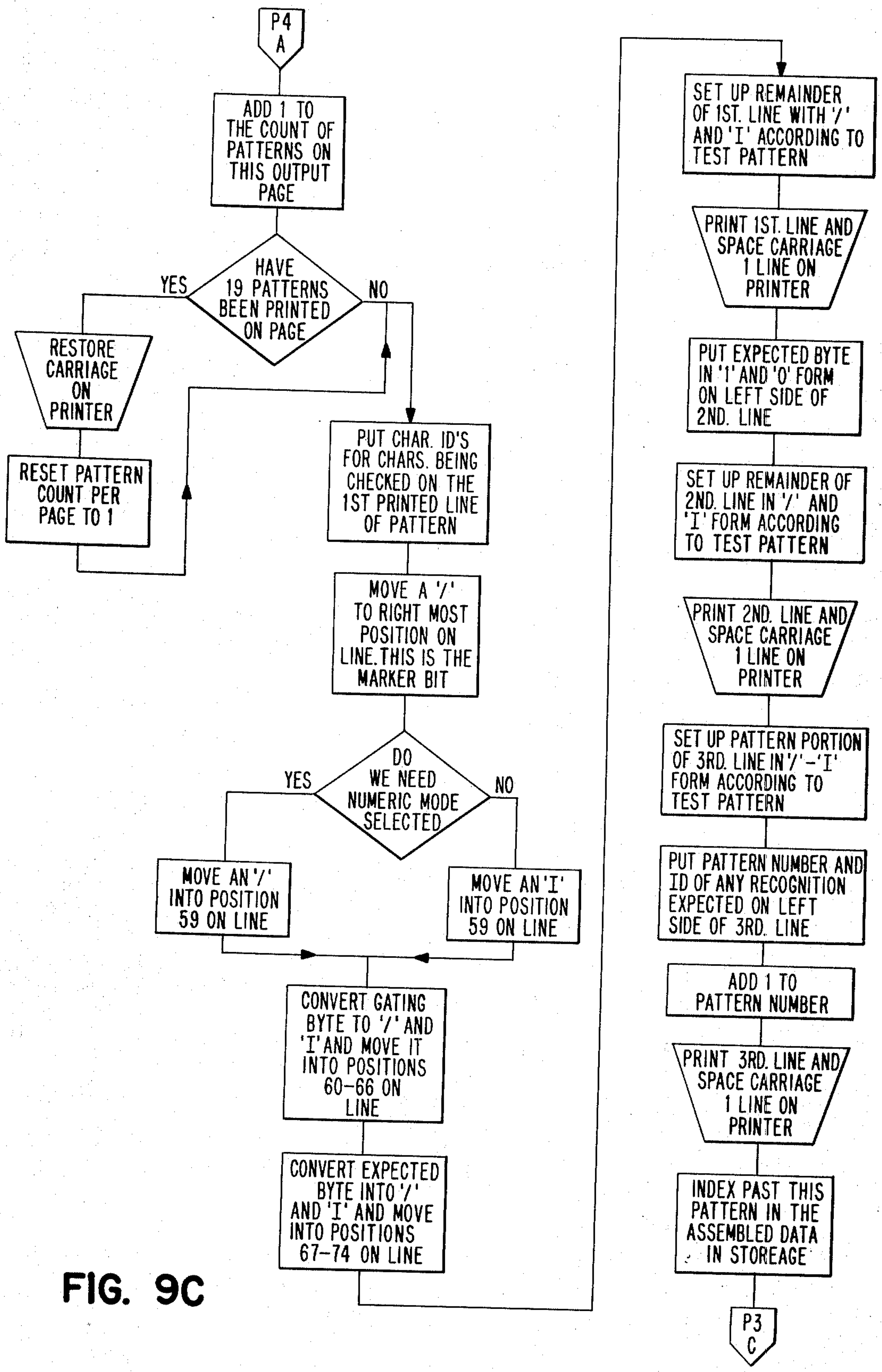

From the foregoing, it is seen that the invention provides a method and apparatus for testing logics and particularly for testing recognition logics in a character recognition machine. The test document can be printed by any well known means; however, FIG. 9 shows a program in flow diagram form for controlling an output printer attached to a computer system for printing the test documents. Complex character recognition machines, such as the IBM 1288 Optical Page Reader, require approximately 12,000 test patterns to fully test the recognition logics. The diagnostic testing can take place at any suitable time because this invention enables the testing to be done on an off-line basis. The machine operator merely loads the hopper with the test documents and then the machine is run in the diagnostic mode as previously described.

Figure 10:
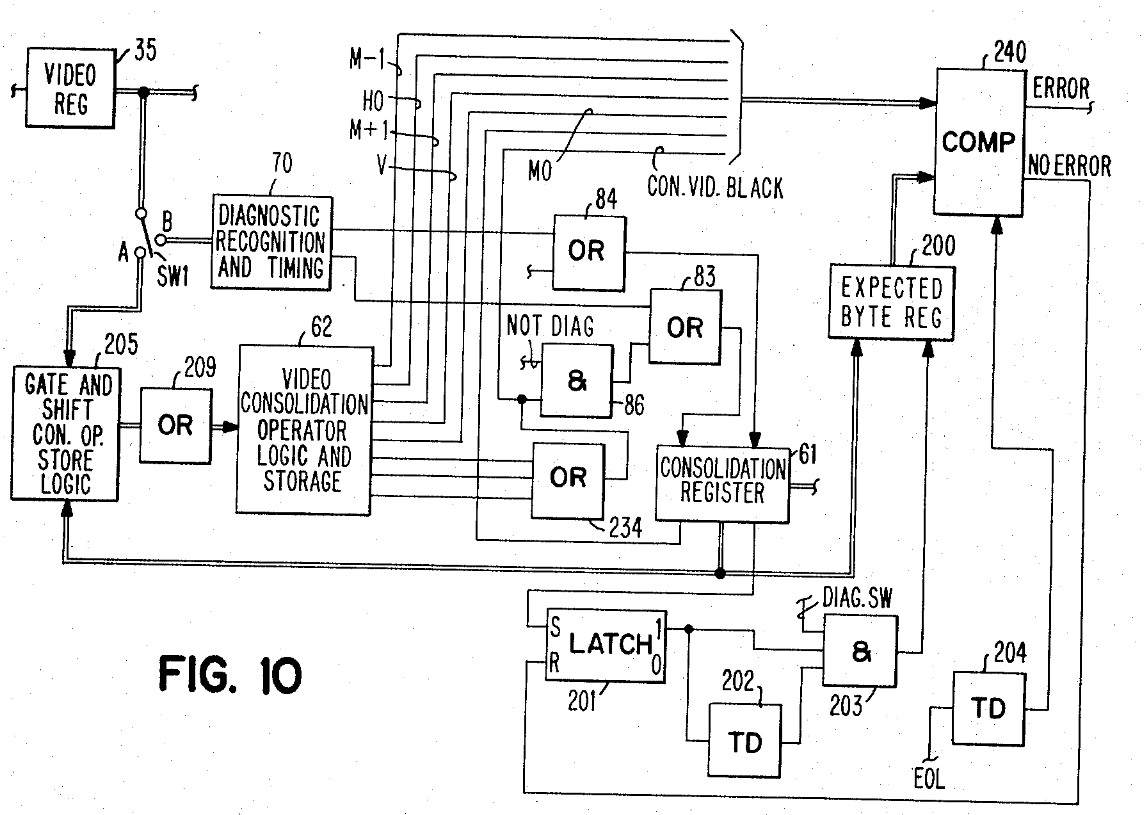
FIG. 10 is a block diagram showing the invention as incorporated into the character recognition machine shown in FIG. 1, but implemented to diagnose the video consolidation logic rather than the recognition logics.
Figure 11:
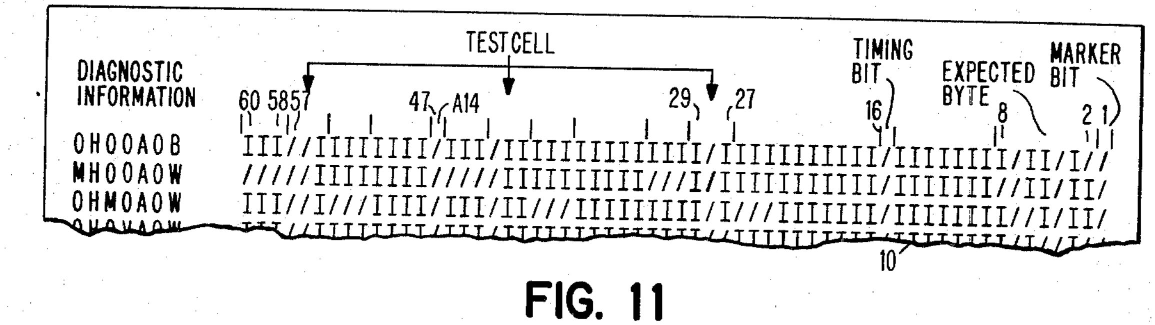
FIG. 11 is a diagram illustrating part of the pre-printed document which is scanned by the character recognition machine when in the diagnostic mode for testing the video consolidation logic.

The invention can also be implemented so as to provide a test bit pattern in the consolidation register for testing the video consolidation operator logic. This implementation is shown in FIG. 10. Switch SW1 is set to contact B so that bits from video register 35 are passed to the diagnostic recognition and timing circuit 70. The document shown in FIG. 11 is scanned in a manner similar to that for scanning the document of FIG. 2. The lines on the document in FIG. 11 are scanned sequentially, each line being scanned from right to left. The first character scanned is a slash (/) symbol, and it is developed into a 1 bit by the diagnostic recognition and timing circuit 70 in a manner as previously described. This one bit is entered into the consolidation register 61 via OR circuit 83 under control of the shift pulse of OR circuit 84.

The next group of characters scanned represents the expected byte which is stored in register 200 after it has been entered into the consolidation register. The characters of this group of seven characters are in a sequence to develop the bits Black Consolidated Video, MO, A14, VO, M+1, HO and M−1. This expected byte is compared with corresponding outputs from the video consolidation operator logic and storage 62 after an entire line on the document in FIG. 11 has been scanned. The group of characters representing the expected byte is followed by a group of seven character I's which resolve into 0 bits for placing a timing bit in a proper location for shifting the storage triggers in the consolidation operator logic and storage circuit 62. The timing bit is represented by a slash (/) symbol and is followed by seven character I's which are developed into 0 bits.

As it will be pointed out in greater detail, the video consolidation operator logic and storage circuit 62 has nine bit inputs. Normally, the nine bit inputs are from positions 1, 2, 3, 43, 44, 45, 85, 86, and 87 of the video register 30. However, according to this invention, the nine bit inputs are taken from positions A1, A2, A3, B1, B2, B3, C1, C2 and C3 of the data consolidation register 61. Thus, the next three characters scanned on the document in FIG. 11 make up part of the nine bits which precede the nine bits forming the test bits for the video consolidation operator logic and storage 62. The next three characters scanned are resolved into three of the nine bits for forming the test bits just mentioned. The next three characters are I's to form part of the nine bit pattern following the test pattern. The next five characters are always I's for developing 0 bits to fill a consolidation scan. The next three characters scanned form three bits of the nine bits that are consolidated immediately in front of the nine bits for forming the test bit pattern. The next three characters scanned develop three bits of the nine bits forming the test pattern. These characters are followed by a group of three characters for forming three more of the nine bits that are consolidated immediately after consolidation of the test bit pattern. The next character scanned is a slash (/) symbol which is used by the video consolidation operator logic 62 to determine whether or not certain test patterns should become black or white video bits. After this symbol is scanned, four I's are scanned to develop 0 bits for filling a consolidation scan. Thereafter, three more characters are scanned to complete the nine bits that are consolidated immediately in front of the test pattern. These characters are followed by three characters which are scanned to complete the test bit pattern. The next three characters scanned complete the nine bits that are consolidated immediately after the test bit pattern. This completes a line of characters to be scanned.

Figure 12A:
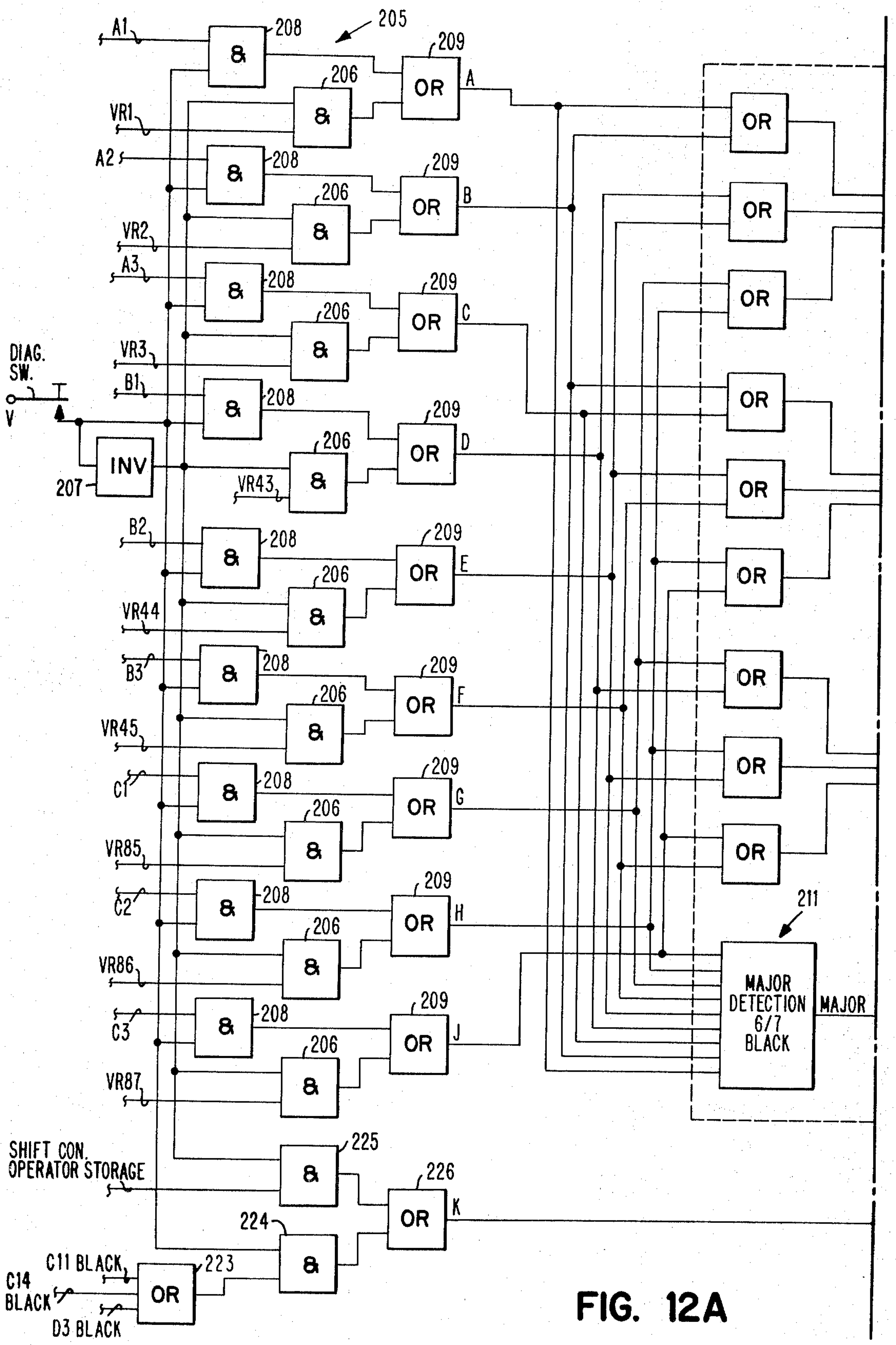
FIG. 12 consists of FIGS. 12A and 12B, and is a schematic logic diagram showing the details of the gating for the consolidation operator logic and the shifting for the consolidation operator storage.
Figure 12B:
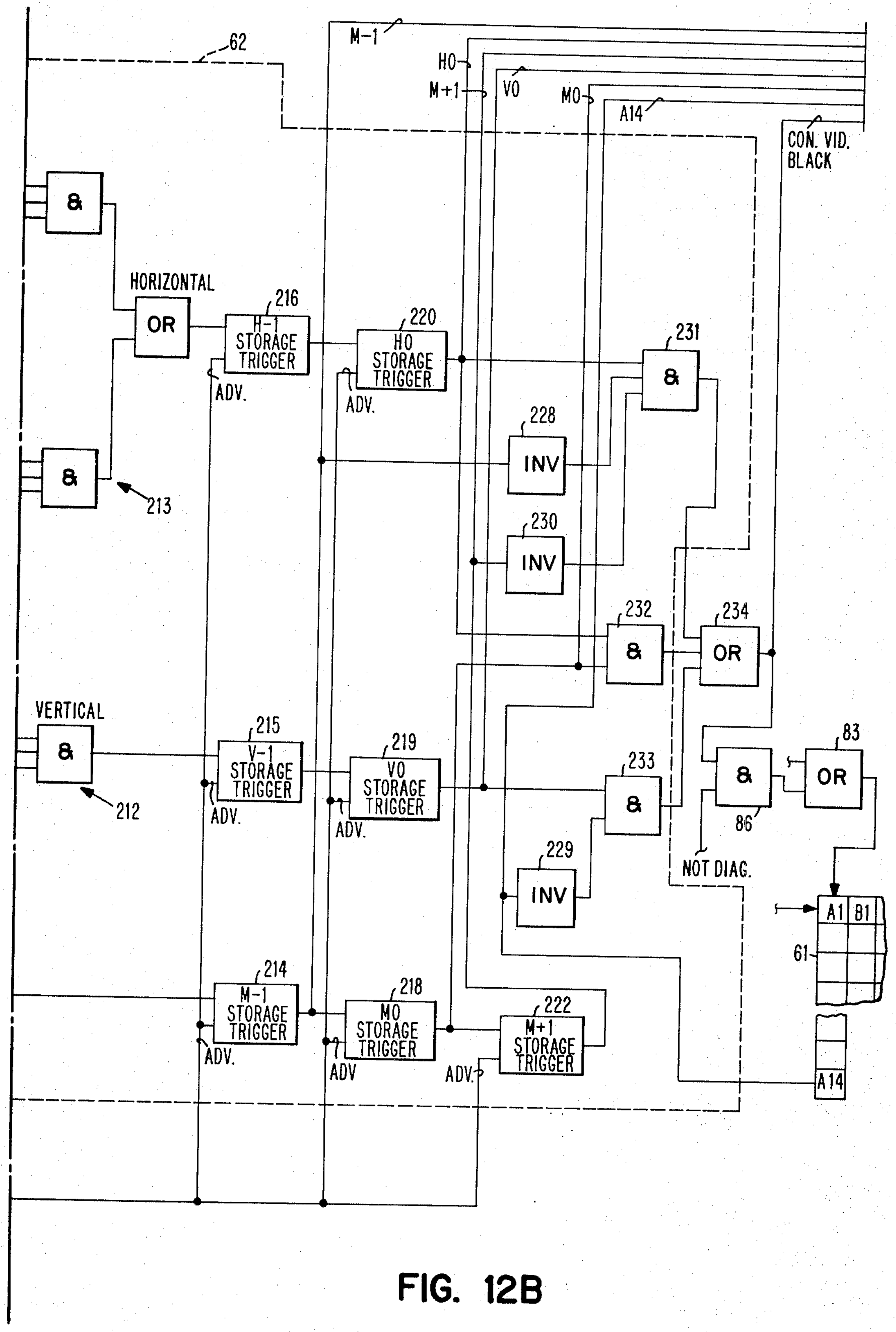

The gate and shift consolidation operator storage logic, 205, FIGS. 10 and 12, enables presentation of bit patterns from either video register 35 or the consolidation register 61 to the video consolidation operator logic and storage 62. In FIG. 12, AND circuits 206 are connected to positions VR1, VR2, VR3, VR43, VR44, VR45, VR85, VR86 and VR87 of the video register 35. These positions are shown on page 2–101 of the IBM Field Engineering Theory of Operation Manual. These AND circuits are conditioned by a Not Diagnostic signal from inverter 207. The outputs of these AND circuits are connected to inputs of OR circuits 209. OR circuits 209 also have inputs connected to outputs of AND circuit 208, which have inputs connected to positions A1, A2, A3, B1, B2, B3, C1, C2 and C3 of the consolidation register 61 and inputs conditioned by a Diagnostic signal which is present when the diagnostic switch is closed.

The outputs of OR circuit 209 are applied to the video consolidation operator logic and storage 62. This circuit consists of consolidation operator logic and consolidation operator storage. The consolidation operator logic consists of major operator logic 211, vertical operator logic 212, and horizontal operator logic 213. The outputs of these logic circuits 211, 212 and 213 are applied to storage triggers 214, 215 and 216 respectively. The information stored in these triggers is advanced to triggers 218, 219 and 220. Subsequently, the information in trigger 218 is advanced into trigger 222. The pulse for advancing the triggers is applied via OR circuit 226 which has inputs from AND circuits 224 and 225. When in the diagnostic mode, the advance pulse is passed by AND circuit 224 whereas when operating in the not diagnostic mode, the advance pulse is passed by AND circuit 225. AND circuit 224 is conditioned by the diagnostic switch being closed and has an input from OR circuit 223. Inputs of OR circuit 223 are connected to positions C11, C14 and D3 of the consolidation register 61. The timing bit which is developed by scanning the slash symbol (/) in the 16th character position on the document, FIG. 11, develops the advance pulses as it passes positions C11, C14 and D3 in the consolidation register.

The outputs of triggers 214 and 222 are applied to inverters 228 and 230 respectively. The outputs of these inverters are connected to inputs of AND circuit 231 which also has an input connected to the output of trigger 220. The output of AND circuit 231 is applied to an input of OR circuit 234, together with outputs from AND circuits 232 and 233. AND circuit 232 has inputs connected to triggers 218 and 220. AND circuit 233 has an input connected to trigger 219 and an input connected to inverter 229 which has its input connected to position A14 of the consolidation register. The output of OR circuit 234 is connected to an input of AND circuit 86 which has its output connected to OR circuit 83. Hence, when operating in the not diagnostic mode, bits will be entered into consolidation register via OR circuit 234, AND circuit 86 and OR circuit 83.

Figure 13A:
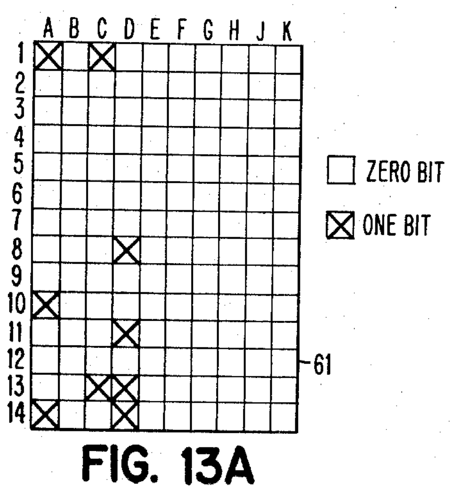
FIG. 13A shows the bit pattern in the consolidation register after 56 characters have been scanned and the marker bit is in position D14.
Figure 13B:
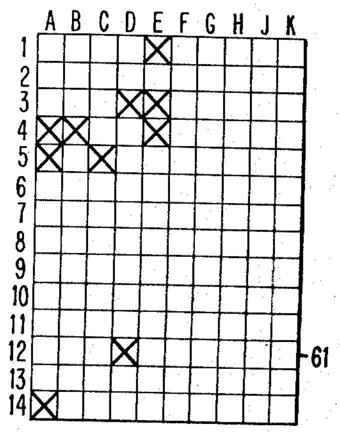
FIG. 13B shows the bit pattern in the consolidation register after a line of characters has been completely scanned.

FIG. 13A shows the bits in the consolidation register after 56 characters on the first line have been scanned. The marker bit is in position D14 of the consolidation register. The set position of latch 201, FIG. 10, is connected to this position. Hence, when the marker bit comes into position D14, latch 201 is set. This is the time that the expected byte is to be transferred to register 200. The set output of latch 201 is connected to time delay 202 which conditions AND circuit 203. AND circuit 203 also has inputs connected to the set output of latch 201 and to the diagnostic switch, FIG. 12. The output of AND circuit 203 gates positions D7–D13 inclusive of consolidation register 61, into register 200. The outputs of register 200 are applied to compare circuit 240. Compare circuit 240 compares the outputs of register 200 with the outputs from the video consolidation operator logic and storage 62 and position A14 of the consolidation register 61. If the video consolidation operator logic and storage 62 is operating properly, an equal comparison will result. Latch 201 is reset by the signal from comparator 240 indicating the equal comparison or no error condition. Thereafter, the next line on the document will be scanned. If the comparison is unequal, an error condition is indicated and the full line on the document is displayed on the display CRT. The video consolidation operator logic and storage circuits 62 are then probed to detect the error.

From the foregoing, it is seen that the invention provides method and apparatus for diagnosis of combinatorial logic. The test bit pattern for testing the logic is developed by scanning patterns on a pre-printed document. Special logic resolves the scanned patterns into 1 and 0 bits. The test bit pattern is applied to the combinatorial logic and the outputs therefrom are compared with an expected byte. If the comparison is equal, no error has occurred. An equal comparison develops an error condition.

What is claimed is:

1. In a pattern recognition machine including scanner means for scanning patterns on documents to generate a plurality of bits for recognizing the pattern scanned and recognition means for recognizing the patterns scanned, the improvement comprising:

test bit pattern generation means for generating a test bit pattern of recognition data representative of a single pattern in response to said scanner means scanning a plurality of two distinguishing patterns by logically examining bit conditions of first predetermined bits of said plurality of bits generated by said scanner means in response to scanning one of said distinguishing patterns and generating a bit having a binary one value when the bit conditions of said first predetermined bits meet predetermined logical conditions and by logically examining second predetermined bits of said plurality of bits generated by said scanner means in response to scanning the other of said distinguishing patterns and generating a bit having a binary zero value when the bit conditions of said second predetermined bits meet predetermined logical conditions whereby the so generated binary one and zero bits form said test bit pattern;

means for applying said test bit pattern to said recognition means;

means for representing the identity of said test bit pattern; and means for comparing the identity of said test bit pattern with the identity produced by said recognition means.

2. The pattern recognition machine of claim 1 further comprising:

means responsive to said comparing means for displaying the patterns scanned when said comparing means indicates that the identity of said test bit pattern does not compare with the identity produced by said recognition means.

3. The pattern recognition machine of claim 1 wherein said test bit pattern includes bits identifying which recognition logics are responsive to said test bit pattern.

4. A method for generating test bit patterns for testing logics in a pattern recognition machine comprising the steps of:

forming a sequence of two distinguishing patterns on a document;

scanning said patterns to generate a plurality of bits for each pattern; and generating from said plurality of bits one type of signal in response to scanning one distinguishing pattern and another type of signal in response to scanning the other distinguishing pattern to form a test bit pattern from said one and another types of signals representing bits generated by said scanning means when scanning a single pattern.

5. The method for generating test bit patterns of claim 4 further comprising the steps of:

applying said test bit pattern to logic circuitry to be tested and checking the output signals from said logic circuitry for a predetermined response.

6. In a pattern recognition machine having scanner means for scanning patterns on documents to generate for each pattern scanned a plurality of data signals representative of the pattern scanned and logic circuitry having a plurality of branches selectively connectable to receive signals produced by said scanner means, the improvement comprising:

test bit generating means responsive to said scanner means scanning a sequence of two distinguishing patterns to produce a test bit of one type from a plurality of bits generated by said scanner when one distinguishing pattern is scanned and a test bit of a second type from a plurality of bits generated by said scanner when the second distinguishing pattern is scanned;

means for applying the test bit pattern produced by said test bit generating means to selected branches of said logic circuitry;

means for selecting the branches of said logic circuitry to be tested;

test bit pattern identification means having outputs for representing the output bits which should be produced by the selected branches of said logic circuitry if said selected branches are operating without error; and means responsive to said outputs from said test bit identification means and outputs from the selected branches for generating signals indicating that said selected branches are either operating with or without error.

7. The pattern recognition machine of claim 6 wherein said means for selecting the branches of the logic circuitry to be tested selects gating bits for branch selection from test bits produced by said test bit generating means.

8. The pattern recognition machine of claim 6 wherein said test bit pattern identification means selects identification bits from test bits produced by said test bit generating means.

9. The pattern recognition machine of claim 6 wherein the two distinguishing patterns are printed characters.

10. The pattern recognition machine of claim 6 wherein the logic circuitry is pattern recognition circuitry.

* * * * *